United States Patent
Eljarat et al.

(10) Patent No.: US 11,079,488 B2
(45) Date of Patent: Aug. 3, 2021

(54) DBSCAN PARAMETERS AS FUNCTION OF SENSOR SUITE CONFIGURATION

(71) Applicant: GM GLOBAL TECHNOLOGY OPERATIONS LLC, Detroit, MI (US)

(72) Inventors: Ishai Eljarat, Raanana (IL); Gonen Barkan, Lehavim (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 443 days.

(21) Appl. No.: 15/978,693

(22) Filed: May 14, 2018

(65) Prior Publication Data
US 2019/0346559 A1    Nov. 14, 2019

(51) Int. Cl.
| | |
|---|---|
| G01S 13/931 | (2020.01) |
| G06K 9/62 | (2006.01) |
| G01S 7/41 | (2006.01) |
| B60W 30/09 | (2012.01) |

(52) U.S. Cl.
CPC .......... *G01S 13/931* (2013.01); *B60W 30/09* (2013.01); *G01S 7/411* (2013.01); *G06K 9/6218* (2013.01); *G01S 2013/93271* (2020.01)

(58) Field of Classification Search
CPC ............................... G01S 13/931; G01S 7/411
USPC ......................................................... 342/70
See application file for complete search history.

(56) References Cited

U.S. PATENT DOCUMENTS

| | | | | |
|---|---|---|---|---|
| 2008/0187174 A1* | 8/2008 | Metaxas | .............. | G06K 9/6209 382/103 |
| 2019/0120633 A1* | 4/2019 | Afrouzi | .................. | G05D 1/027 |

* cited by examiner

*Primary Examiner* — Bo Fan
(74) *Attorney, Agent, or Firm* — Cantor Colburn LLP

(57) ABSTRACT

A vehicle, radar system and method of detecting an object is disclosed. The radar system includes plurality of sensors a plurality of sensors, wherein a field of view of one of the plurality of sensors overlaps a field of view of at least another of the plurality of sensors at a region, and a processor. The processor is receives from the plurality of sensors a detection from the region, the detection related to an object, determines an overlap value for the region, adjusts a density parameter of a clustering criterion based on the overlap value, and determines a valid clustering of the detection with a neighboring detection using the adjusted density parameter.

12 Claims, 5 Drawing Sheets

DBSCAN PARAMETERS AS FUNCTION OF SENSOR SUITE CONFIGURATION

INTRODUCTION

The subject disclosure relates to detecting an object at a vehicular radar system and, in particular, to a system and method for clustering radar detections in regions covered by the fields of view of multiple sensors of a radar system in order to detect the object.

Radar systems used in vehicles obtain a plurality of reflections of electromagnetic waves, known as detections, and determines one or more objects in the field of view of the radar system from the detections. In order to determine an object, a clustering algorithm is applied to the detections to determined valid groupings or clustering of detections related to the object. In regions from which multiple sensors are receiving detections a fixed set of density parameters used in the clustering algorithm can lead to incorrectly classifying some detections as noise. Accordingly, it is desirable to provide a clustering algorithm that takes into account the overlap between fields of view of sensors in order to improve the quality of the clustering algorithm in order to better determine the existence, location and other parameters of the objects.

SUMMARY

In one exemplary embodiment, a method of detecting an object is disclosed. The method includes obtaining detections related to the object at a plurality of sensors in a radar system, determining for a detection an overlap value for a region in which the detection is located, adjusting a density parameter of a clustering criterion based on the overlap value, and determining a valid clustering of the detection with a neighboring detection to determine the object using the adjusted density parameter.

In addition to one or more of the features described herein, the method includes adjusting the density parameter by adjusting at least one of a gate size of a clustering algorithm and a minimum points requirement of the clustering algorithm. The method further includes multiplying the gate size and minimum points requirement for a region covered by a single sensor by the overlap value for the region in which the detection is located. The method further includes adjusting the at least one of a gate size of a clustering algorithm and a minimum points requirement by at least a sensor alignment score. The method further includes determining a noise signal. In various embodiments, the method includes performing an action at a vehicle based on the determined location of the object.

In yet another exemplary embodiment, a radar system is disclosed. The radar system includes plurality of sensors a plurality of sensors, wherein a field of view of one of the plurality of sensors overlaps a field of view of at least another of the plurality of sensors at a region, and a processor. The processor is configured to receive from the plurality of sensors a detection from the region, the detection related to an object, determine an overlap value for the region, adjust a density parameter of a clustering criterion based on the overlap value, and determine a valid clustering of the detection with a neighboring detection using the adjusted density parameter.

In addition to one or more of the features describe herein, the processor is further configured to adjust the density parameter by adjusting at least one of a gate size of a clustering algorithm and a minimum points requirement of the clustering algorithm. The processor is further configured to adjust the gate size and minimum points requirement by multiplying the gate size and minimum points requirement by the overlap value for the region. The processor is further configured to adjust the at least one of a gate size and the minimum points requirement by a sensor alignment score. The processor is further configured to reduce a number of false noise signals from the clustering algorithm. The processor is further configured to determine the object from the valid clustering. In various embodiments, the processor is configured to perform an action at a vehicle based on the determined the object.

In yet another exemplary embodiment, a vehicle is disclosed. The vehicle includes a plurality of radar sensors, wherein a field of view of one of the plurality of radar sensors overlaps a field of view of at least another of the plurality of radar sensors at a region, and a processor. The processor is configured to receive from the plurality of radar sensors a detection from the region, the detection related to an object, determine an overlap value for the region, adjust a density parameter of a clustering criterion based on the overlap value, and determine a valid clustering of the detection with a neighboring detection using the adjusted density parameter.

In addition to one or more of the features describe herein, the processor is further configured to adjust the density parameter by adjusting at least one of a gate size of a clustering algorithm and a minimum points requirement of the clustering algorithm. The processor is further configured to adjust the gate size and minimum points requirement by multiplying the gate size and minimum points requirement by the overlap value for the region. The processor is further configured to adjust the at least one of a gate size and the minimum points requirement by a sensor alignment score. The processor is further configured to reduce a number of false noise signals from the clustering algorithm. The processor is further configured to determine the object from the valid clustering. In various embodiments, the processor is configured to perform an action at the vehicle based on the determined object.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
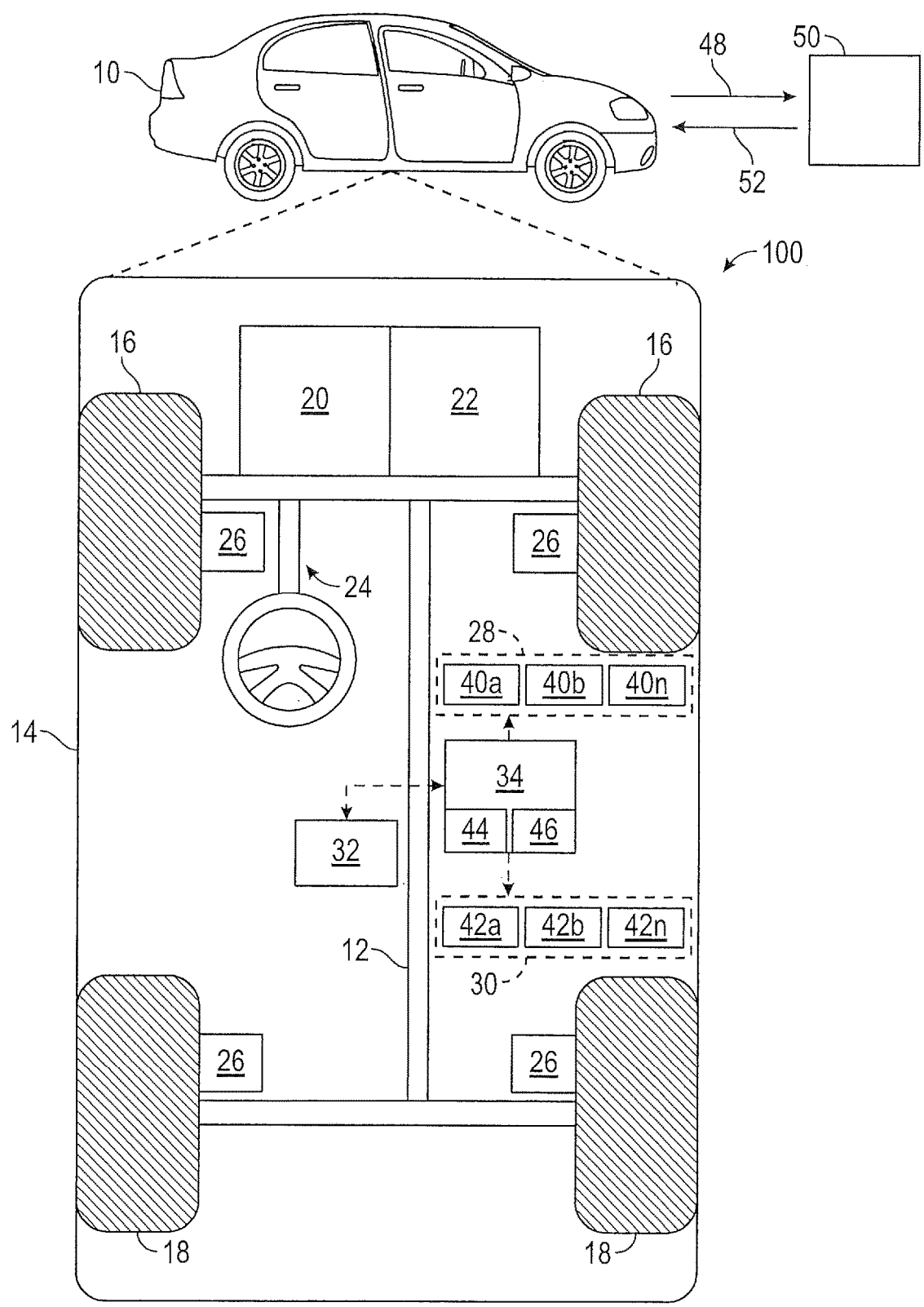
FIG. 1 shows a vehicle with an associated trajectory planning system in accordance with various embodiments.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10 with an associated trajectory planning system depicted at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. In various embodiments, the vehicle 10 includes a radar system including an array of radar sensors, the radar sensors being located at various locations along the vehicle 10. In operation, a radar sensor sends out an electromagnetic pulse 48 that is reflected back at the vehicle 10 by one or more objects 50 in the field of view of the sensor. The reflected pulse 52 appears as one or more detections at the radar sensor. Any sensor that covers the region in which the object 50 is located, i.e., has the object in its field of view, can receive the reflection 52 and therefore obtain a detection of the object 50. In an array of sensors, the object 50 can be in the field of view of more than one sensor.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as ventilation, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The trajectory planning system 100 navigates the autonomous vehicle 10 based on a determination of objects and/or their locations within the environment of the vehicle. In various embodiments the controller 34 performs calculations to determine the presence and/or location of an object in the vehicle's environment from a plurality of detections received at one or more sensors of the radar system of the vehicle 10. Upon determining various parameters of the object, such as range, azimuth, elevation, velocity, etc., from the plurality of detections, the controller 34 can operate the one or more actuator devices 42a-n, the propulsion system 20, transmission system 22, steering system 24 and/or brake 26 in order to navigate the vehicle 10 with respect to the object 50. In various embodiments, the controller 34 navigates the vehicle 10 so as to avoid contact with the object 50.

Figure 2:
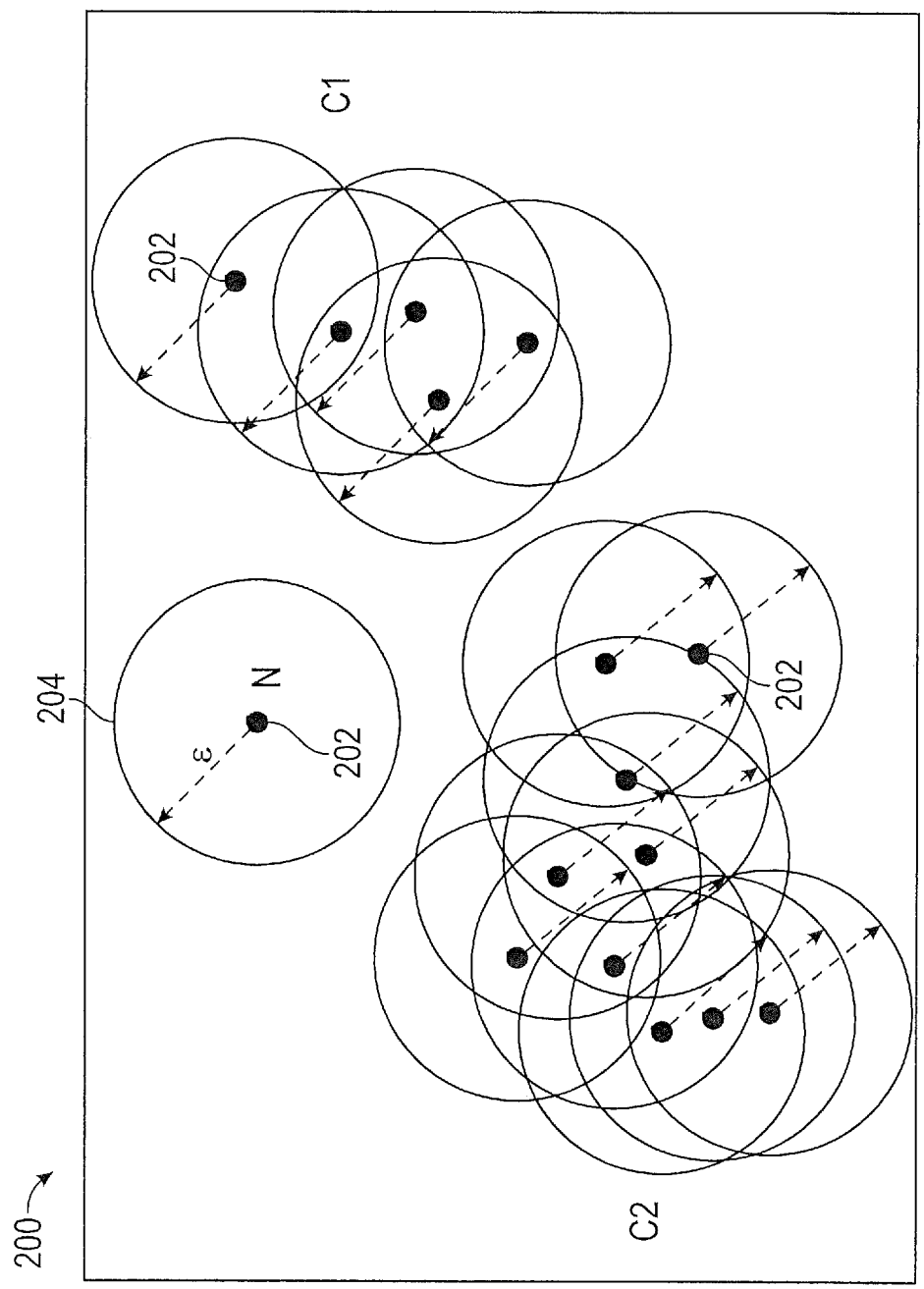
FIG. 2 shows an illustrative radar detection field received at a sensor of a radar system of the vehicle of FIG. 1.

FIG. 2 shows an illustrative radar detection field 200 received at a sensor of the radar system of the vehicle 10 of FIG. 1. The radar detection field 200 includes a plurality of detections (indicated by dots 202) obtained by the sensor. The radar detection field 200 further shows a clustering algorithm being applied to the plurality of detections in order to form clusters among detections related to a same object. In various embodiments, the clustering algorithm is a DBSCAN (density-based spatial clustering of applications with noise) algorithm.

The clustering algorithm groups detections using two density parameters: a gate size ε, and a minimum point minPts. These parameters define a minimum required density of detections to qualify the detections as part of a cluster. The gate size is generally a radius of a circle 204 or sphere surrounding a selected detection and indicates a search region in which to look for neighboring detections. The processor 34 searches for neighboring detections within the circle 204 or sphere indicated by the gate size and provides a count of the number of neighboring detection within the circle or sphere. The minPts parameter indicates a threshold for the count above which the algorithm defines a valid cluster of detections. In other words, when the number of neighboring detections within the circle 204 or sphere is less than minPts, the clustering algorithm considers the detections to be unrelated. When the number of neighboring detections within the circle 204 or sphere is greater than the minPts, the clustering algorithm groups the detections as part of the same cluster. In the illustrative embodiment of FIG. 2, the value of the minPts parameter is set to 3. However any suitable value for minPts can be used in alternate embodiments. As a result of the clustering algorithm with minPts=3, a group of detections at the top right of the detection field 200 is categorized as a first cluster C1 and a group of detections at the lower left of the detection field 200 is categorized as a second cluster C2. A single detection in the top middle of the detection field 200 has no immediate neighboring detections and is therefore categorized as noise 'N'.

The selection of gate size and minPts changes the outcome of the clustering algorithm detections. With several sensors receiving detections from the same object, it may become useful to change the gate size and minPts to accommodate the increased number of detections. In contrast, using a single fixed set of density parameter (ε, minPts) for an array of sensors having overlapping fields of view can lead to incorrectly classifying detections as noise.

Figure 3:
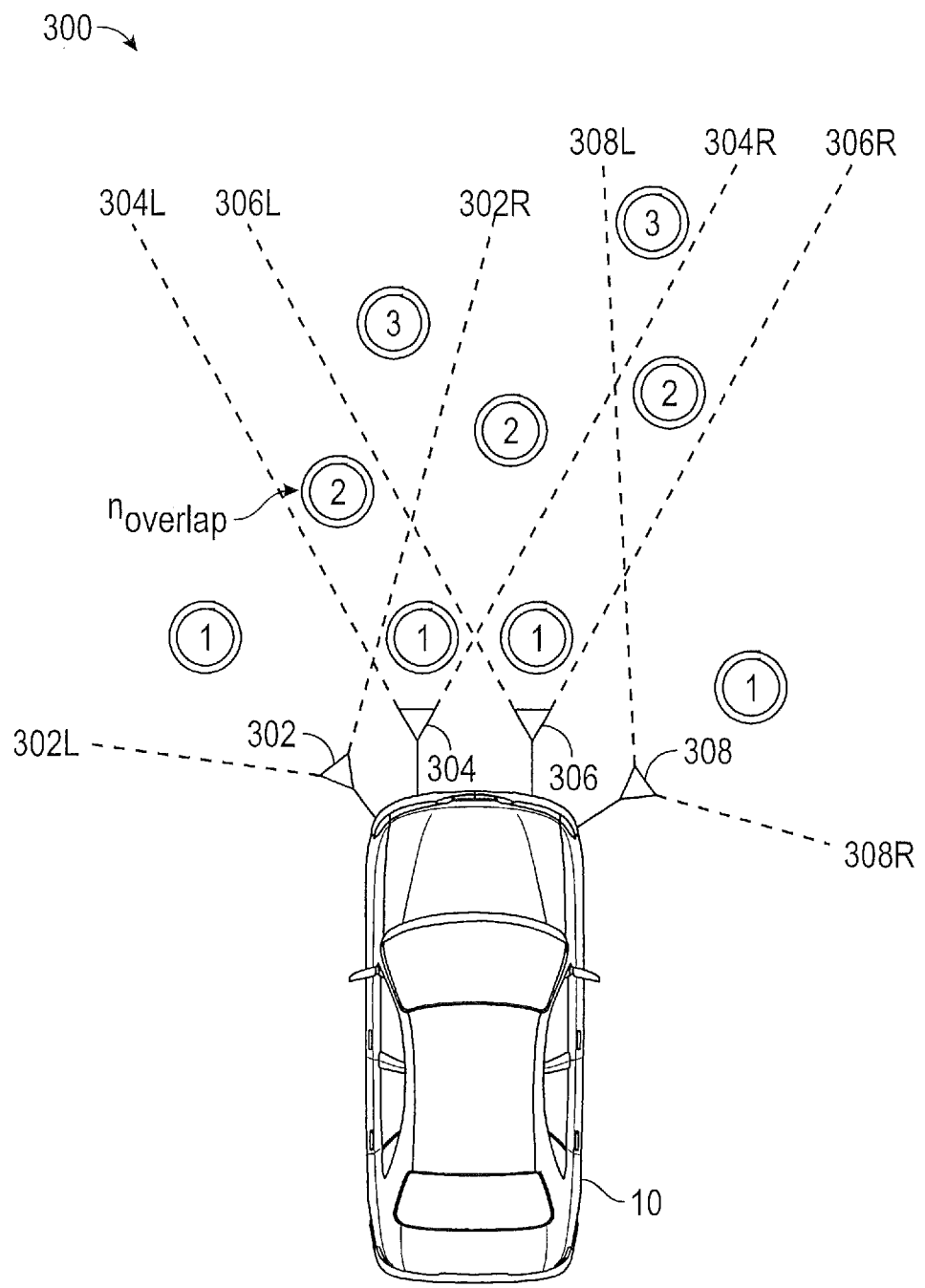
FIG. 3 illustrates overlap between fields of view of multiple radar sensors disposed on a vehicle.

FIG. 3 illustrates overlap between fields of view of multiple radar sensors disposed on a vehicle. For illustrative purposes, radar sensors 302, 304, 306 and 308 are located at a front end of the vehicle 10. However, the radar sensors 302, 304, 306 and 308 can be located at any selected location of the vehicle 10 in alternate embodiments. Each sensor has a field of view that defines a region of space covered by the sensors. A region of space is covered by a sensor if an object in the region of space can be detected by the sensor. The field of view for a sensor is generally given by an elliptical cone.

Figure 4B:
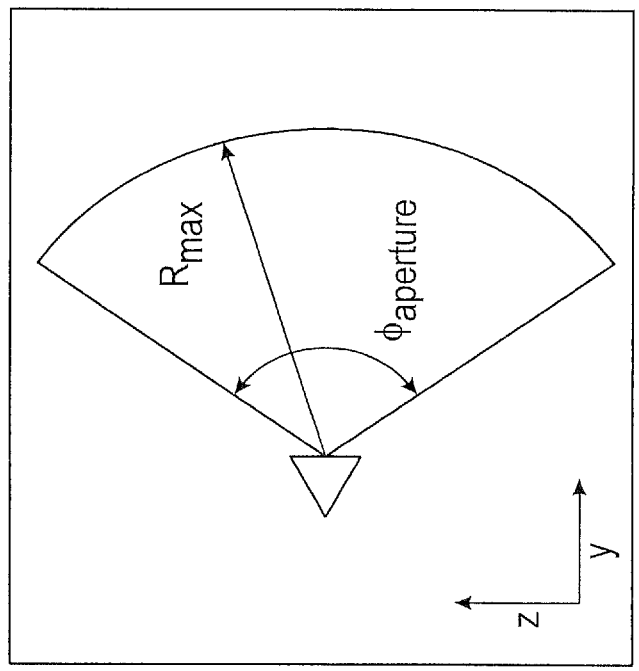
FIGS. 4A and 4B illustrate a field of view for an exemplary sensor from top and side views, respectively.
Figure 4A:
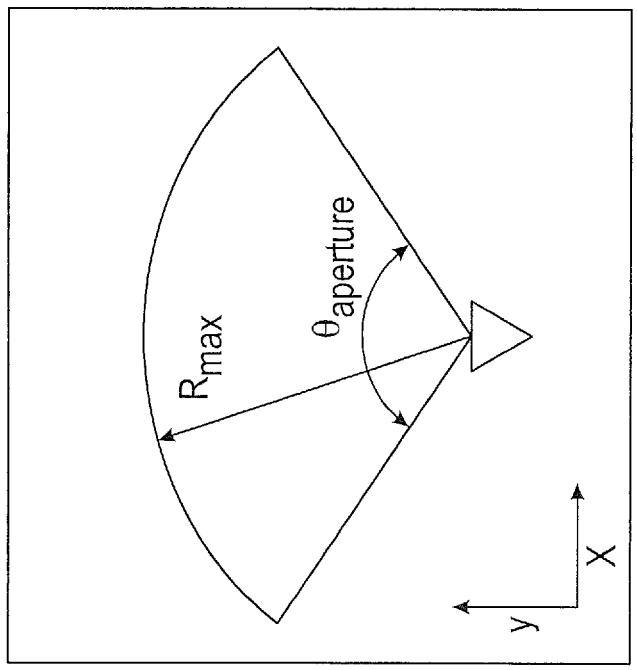

FIGS. 4A and 4B illustrate a field of view for an exemplary sensor from top and side views, respectively. FIG. 4A shows the field of view from a top view of the sensor. The field of view from the top view is defined by the range $R_{max}$ of the sensor and an azimuth aperture $\theta_{aperture}$ of the sensor. FIG. 4B shows a field of view from a side view of the sensor. The field of view from the side view is defined by the range $R_{max}$ of the sensor and an elevation aperture $\varphi_{aperture}$ of the sensor.

Returning to FIG. 3, the limits to the fields of view along the azimuth are shown for the sensors 302, 304, 306 and 308. The field of view of sensor 302 is bounded by left limit 302L and right limit 304R. The field of view of sensor 304 is bounded by left limit 304L and right limit 304R. The field of view of sensor 306 is bounded by left limit 306L and right limit 306R. The field of view of sensor 308 is bounded by left limit 308L and right limit 308R. The fields of view of these sensors 302, 304, 206 and 308 overlap in some regions. For example, a volume of space includes regions (labelled '1') which are only covered by a single sensor, regions (labelled '2') which are covered by two sensors and regions (labelled '3') which are covered by three sensors. Although additional regions are not shown in FIG. 3, regions that are covered by four or more sensors is also possible, especially in a radar system that includes more than the four sensors shown in FIG. 3. The number radars that cover a specific point or region in space can be indicated by the parameter $n_{overlap}$. Once the parameter $n_{overlap}$ is determined for a region, the density parameters (i.e., gate size and minPts) of the clustering algorithm can be adjusted in order to cluster detections while reducing a false counting of a detection as noise.

In order to adjust the density parameters, one first determines a value of $n_{overlap}$ for a region. If $S_i$ is the set of points which belong to the field of view of the $i^{th}$ sensor, then $$g_i(x, y, z) = \begin{cases} 1, & \text{if } (x, y, z) \in S_i \\ 0, & \text{otherwise} \end{cases} \qquad \text{Eq. (1)}$$

and $$n_{overlap}(x, y, z) = \sum_{i=1}^{N_{sensors}} g_i(x, y, z) \qquad \text{Eq. (2)}$$

Once $n_{overlap}$ has be determined for a region, the density parameters are adjusted accordingly, In particular, $$\varepsilon(n_{overlap}) = \gamma_1 n_{overlap} \varepsilon_O \qquad \text{Eq. (3)}$$

and $$minPts(n_{overlap}) = \gamma_2 n_{overlap} minPts_0 \qquad \text{Eq. (4)}$$

where the parameters $\varepsilon_O$ is a gate size and $minPts_0$ is the count threshold for defining a valid cluster in a region covered by a single sensor. The parameters $\gamma_1$ and $\gamma_2$ are related to a score_alignment by the following equations:

$$\gamma_1 \propto 1/\text{score\_alignment} \qquad \text{Eq. (5)}$$

and $$\gamma_2 \propto \text{score\_alignment} \qquad \text{Eq. (6).}$$

Figure 5:
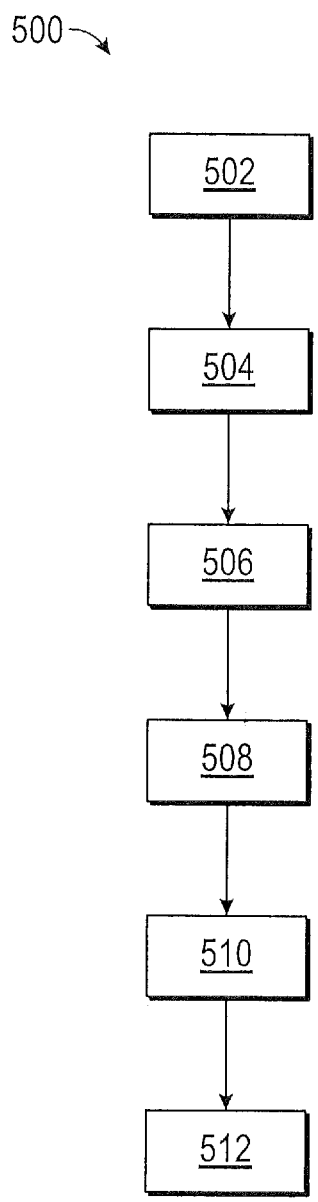
FIG. 5 shows a flowchart illustrating a method of detecting an object in a field of view of an array of radar sensors.

The score alignment is a number between 0 and 1 that indicates a quality of alignment of the sensors to a selected ideal configuration of the sensors. A score_alignment near 0 indicates a poor alignment of sensors, while a score-alignment near 1 indicates a good alignment of sensors. According to Eq. (3), assuming good alignment, the gate size ε for a detection increases as the number of sensors covering the region that includes the detection increases. According to Eq. (3), the number of minPts also increase as the number of sensors covering the region increase. The clustering algorithm is therefore performed using the adjusted density parameters derived from the Eqs. (1)-(6). For example, in a region having $n_{overlap}=2$, the clustering is performed using gate size $\varepsilon(2)=2\gamma_1\varepsilon_0$ and $minPts(2)=2\gamma_2 minPts$ Other parameters may be used to affect or adjust the values of $\varepsilon(n_{overlap})$ and minPts $(n_{overlap})$, either in addition to score_alignment or as an alternative to score_alignment. Using an alignment score as a parameter for the Eqs. (5) and (6) is an example. In other embodiment, the functions of Eqs. (5) and (6) can take into account other relevant parameters FIG. 5 shows a flowchart 500 illustrating a method of detecting an object in a field of view of an array of radar sensors. In box 502, a plurality of detections are obtained at one or more sensors of a radar system. In box 504, a detection is selected and an overlap value $n_{overlap}$ is determined for the region in which the detection is located. In box 506, the gate size ε and minPts parameters are determined and/or adjusted for the value of $n_{overlap}$. In box 508, the clustering algorithm is performed on the selected detection using the gate size ε and minPts determined for the value of $n_{overlap}$ for the region of the detection in order to determine a valid cluster of detections. In box 510, the processor 34 identifies the object from the valid cluster. In box 512, the processor 34 performs a suitable action at the vehicle with respect to the object based on the parameters of the object, such as its location and/or velocity.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system suitable for operating a vehicle, comprising:
    a plurality of sensors, wherein a field of view of one of the plurality of sensors overlaps a field of view of at least another of the plurality of sensors at a region; and
    a processor configured to:
    receive from the plurality of sensors a plurality of detections related to an object in a region;
    determine an overlap value for the region;
    adjust a density parameter of a clustering criterion based on the overlap value;
    select a detection from the plurality of detections;
    group the selected detection and at least one neighboring detection as a cluster using the adjusted density parameter;
    determine a parameter of the object from the cluster; and
    navigate the vehicle with respect to the object using the parameter.

2. The radar system of claim 1, wherein the processor is further configured to adjust the density parameter by adjusting at least one of a gate size of a clustering algorithm and a minimum points requirement of the clustering algorithm.

3. The method of claim 2, wherein the processor is further configured to adjust the gate size and minimum points requirement by multiplying the gate size and minimum points requirement by the overlap value for the region.

4. The method of claim 2, wherein the processor is further configured to adjust the at least one of a gate size and the minimum points requirement by a sensor alignment score.

5. The method of claim 1, wherein the processor is further configured to reduce a number of false noise signals from the clustering algorithm.

6. The radar system of claim 1, wherein the density parameter includes a gate size and a minimum points requirement and the processor is further configured to group the selected detection and the at least one neighboring detection as a cluster when a number of the selected detection and the at least one neighboring detection with a circle or sphere defined by the gate size is greater than the minimum points requirement.

7. A vehicle, comprising:
    a plurality of radar sensors, wherein a field of view of one of the plurality of radar sensors overlaps a field of view of at least another of the plurality of radar sensors at a region;
    a processor configured to:
    receive from the plurality of radar sensors a plurality of detections related to an object in a region;
    determine an overlap value for the region;
    adjust a density parameter of a clustering criterion based on the overlap value;
    select a detection from the plurality of detections;
    group the selected detection and at least one neighboring detection as a cluster using the adjusted density parameter;
    determine a parameter of the object from the cluster; and
    navigate the vehicle with respect to the object using the parameter.

8. The vehicle of claim 7, wherein the processor is further configured to adjust the density parameter by adjusting at least one of a gate size of a clustering algorithm and a minimum points requirement of the clustering algorithm.

9. The vehicle of claim 8, wherein the processor is further configured to adjust the gate size and minimum points requirement by multiplying the gate size and minimum points requirement by the overlap value for the region.

10. The vehicle of claim 8, wherein the processor is further configured to adjust the at least one of a gate size and the minimum points requirement by a sensor alignment score.

11. The vehicle of claim 7, wherein the processor is further configured to reduce a number of false noise signals from the clustering algorithm.

12. The vehicle of claim 7, wherein the density parameter includes a gate size and a minimum points requirement and the processor is further configured to group the selected detection and the at least one neighboring detection as a cluster when a number of the selected detection and the at least one neighboring detection with a circle or sphere defined by the gate size is greater than the minimum points requirement.

* * * * *